Patented May 22, 1934

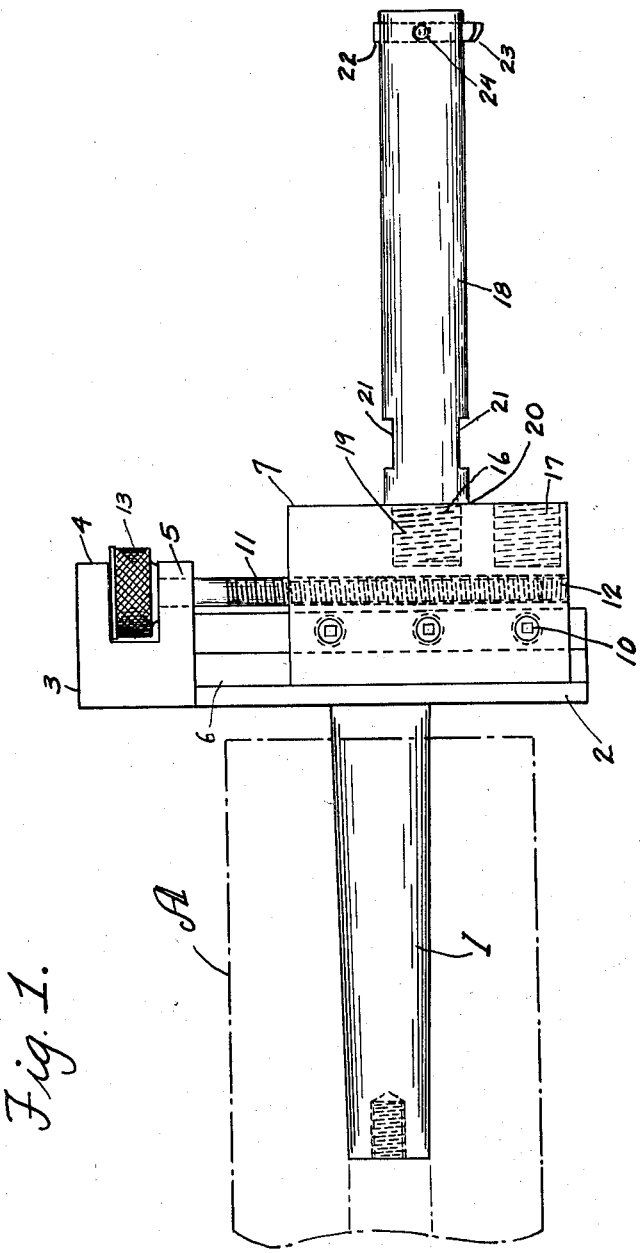

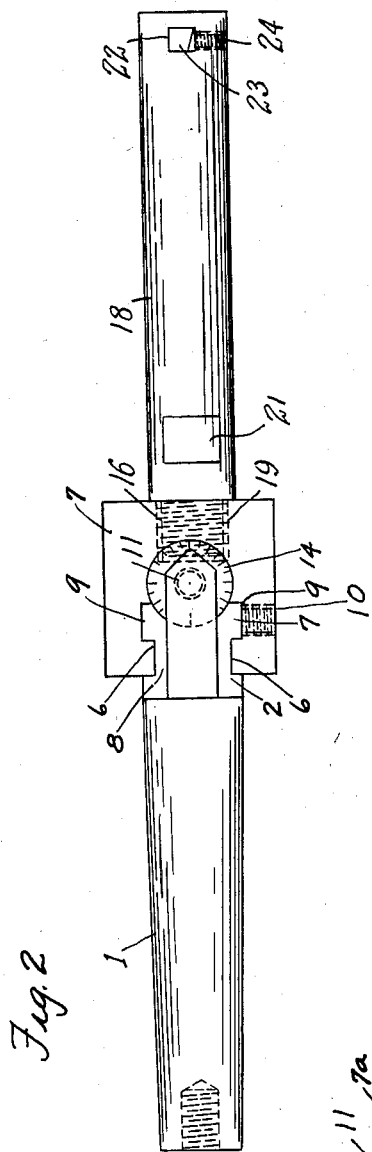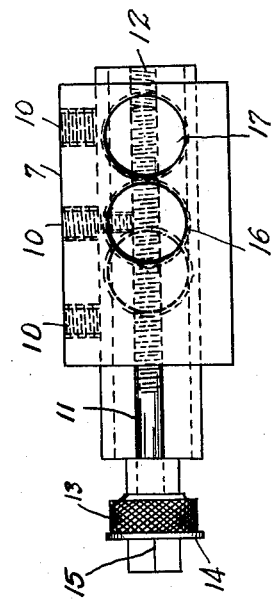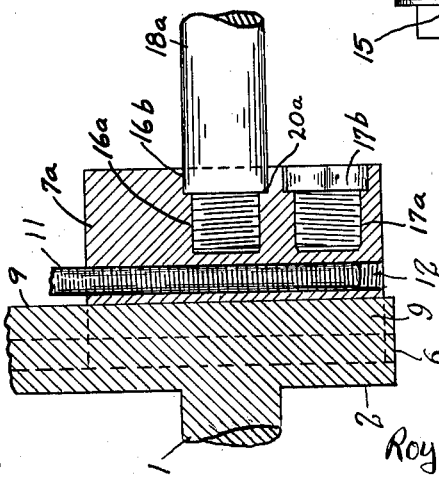

1,960,124

UNITED STATES PATENT OFFICE 1,960,124

BORING TOOL HOLDER OR BORING BAR

Roy V. Russell, Middletown, Ohio

Application March 23, 1931, Serial No. 524,495

2 Claims. (Cl. 279—6)

My invention relates to machine tools, and more especially to tool holders, or the like.

The object of my invention is to provide such a device which may be readily fitted to machine tools with which such devices are employed, as for instance, lathes, drilling machines, milling machines, boring mills and the like, and which, when so fitted, may be radially adjusted as to sweep or diameter of bore of the tool.

A further object is to provide a fine adjustment in the above respect, while providing for a wide range of adjustment, accompanied by such fine adjustment at any position within the wide range of adjustment.

A further object is to make such a device simple and economical of construction; and also easy to maintain in accurate working condition, and which will remain in such condition after a comparatively long period of use and wear.

These and other objects of my invention, which will be set forth hereinafter or will be apparent to one skilled in the art upon reading these specifications, I accomplish by that certain construction and arrangement of parts of which I shall now describe a preferred embodiment, reference being had to the drawings which accompany this application.

Referring to the drawings:—

Fig. 1 is a side elevation of a device embodying my invention, part of a machine tool spindle being shown by dot and dash lines.

Figure 2 is a plan view of the same.

Figure 3 is an end elevation of the same, looking to the left in Fig. 1 or Fig. 2.

Figure 4 is a partial vertical section showing a modification of the tool bar attachment to the sliding head.

The shank 1, which preferably is a taper shank of some standard taper, will fit the spindle A of a lathe, drill, milling machine, or the like, as is well known in the art. The larger or outer end of this shank has integral with the shaft, or at least fixed on the shank, the head 2, disposed diametrically to the shank 1, and having at one end the bearing bracket 3 comprising an outer bracket 4 and an inner bracket 5 in alignment radially of the device; while the remainder of the length of the head 2 has in its opposite sides, slots 6 parallel with this radial line.

The sliding head 7 is in the form of a somewhat elongated block, having longitudinally in the middle of one side a wide and deep slot 8, the inner portion of which is widened, forming inner walls 9. That is to say, the slot 8 is a T-slot with an unusually wide stem to the T; this slot being proportioned so that the head 7 will receive snugly the longitudinally slotted major part of the radial head 2, with parts of the sliding head 7 in the slots 6 of the other head 2, and parts of this other head 2 in the slots 9 of the sliding head 7. At intervals along one side of this sliding head 7, set screws 10, in this case three in number, are tapped through the side of the head to clamp against the adjacent part 9 of the radial head 2 that is fixed on the shank 1; so that by loosening these screws the one head 7 may be slid along the other head 2, and then when the screws 10 are tightened the two heads are held rigidly in their relative adjustment.

To effect this sliding of the two heads 2 and 7 relatively to each other with the desired degree of precision, a shaft 11 has one end part journaled in the bearings 4 and 5, and has its other part or major part of its length threaded into a tapped opening 12 extending longitudinally entirely through the sliding head 7, close to the before described slot 6 of this head, and in alignment with the bearings 4 and 5 of the radial head 2 when the sliding head 7 is slidingly mounted thereon, as just before described. Between the bearings 4 and 5, a circular knurled knob 13 is fixed on the threaded shaft 11, and fits snugly between the two bearings 4 and 5, so that axial movement of the shaft 11 is prevented thereby. On its outer face this knob preferably has a concentric series of graduations 14; and the outer exterior part of the outer bearing 4 has a reference point 15, to which graduations 14 may be referred for reading the adjustment afforded by the co-action of the threaded shaft or screw 11 with the sliding head 7.

The sliding head 7 has considerable extension outward past the threaded opening 12, and has in its face, that is the face opposite from the shank end of the device, a plurality of tapped sockets, in this instance there being two such tapped sockets 16 and 17; the one socket 16 being midway of the length of the head 7, and the other socket 17 being near one end of this head 7. The tool holding bar 18 is, as here shown, a round bar, having a reduced end part 19 threaded to screw closely into either one of the tapped sockets 16 and 17, and to draw closely against the face of the slide or block 7 an accurately formed shoulder 20 permitted by this reduction of diameter. Shortly outward from the shoulder 20 the round bar 18 has opposite flats 21 adapted to receive a wrench for screwing the bar 18 into and out of either socket 16 or 17. In its opposite end this bar 18 has an opening 22 diametrically through it, of square cross section, to receive snugly a usual square tool bit 23, which is clamped in place by a set screw 24 tapped through one side of the bar into the opening 22; this manner of setting a tool in a bar of course being well known in the art.

It will be seen that the possibility of shifting the tool bar 18 to a more radially outward position in the slide or block 7 gives the tool a wide range of adjustment without necessitating undue length of the radial head 2 or the adjusting screw 11; yet, after the coarser adjustment has been made by setting the tool bar 18 as required in the head or block 7, it may be very accurately adjusted to bore within as close limits as may be desired. This accurate adjustment is facilitated by the ample bearing of the screw 11 in the long threaded opening 12, making it possible to make this fine adjustment after the partial clamping has been made by the set screws 10. Preferably the screw 11 has forty threads to the inch, and the graduations 14 of the knob 13 make twenty-five divisions; so that each graduation represents a setting of the bar 18 and its tool bit 23 in and out one thousandth of an inch.

In the modification shown in Figure 4 the tapped sockets 16a and 17a of the sliding head 7a have counter bores 16b and 17b, into which a part of the tool bar 18a snugly fits when the threaded end portion of the bar is screwed into either socket. The shoulder 20a of the bar seats accurately on the inner end of the counter bore 16b or 17b, so that this fitting of the shoulder and the fitting of the tool bar in the counter bore rigidly connects the tool bar 18a to the sliding head 7a in either position to practically eliminate deflection at the outer end of the bar. In either example, it will be understood that the threads of the sockets 16 and 17, or of the sockets 16a and 17a, and of the bar 18 or 18a, are cut so that the rigid fitting of the bar to the head is completed when the tool bit 23 is directed radially outward in the direction of adjustment of the device. This modification of Fig. 4 is merely illustrative of some of the variations possible in the construction of my invention; and it will be understood that other modifications may be desirable in practice, either in respect of these details or other details of the device, and that I am not limited to the precise disclosure herein.

Having thus described my invention, what I claim as new and desire to secure by Letters Patent, is:—

1. In a device of the character described, a head in the form of a bar of continuously solid cross section with an enlargement integral therewith at one end thereof, recessed to form members spaced in the direction of the length of the bar and extending past one face of the bar, the sides of the bar having longitudinal undercut guides, a shank on the opposite face of the bar to mount the head for rotation, a slide in the form of a block recessed on one face to straddle the bar and engage in the undercut guides thereof, said slide having a threaded opening through it from end to end along and close to said one face of the bar, and having an extension out past said threaded opening, provided with means for mounting a tool member at various locations along the length of the slide, and a screw threaded into said threaded opening and having a journal bearing in the inner one of the members of said enlargement and having an enlarged manipulating head fitting between and having end-thrust bearings against the adjacent sides of said members.

2. A device as set forth in claim 1, including a plurality of lock screws threaded through one side of the recess of the slide, at intervals therealong, to engage with the bar within its adjacent undercut guide, the axes of said screws being substantially at right angles to the axes of the shank and the screw, whereby said screws have their outer ends easily accessible for turning the screws when the shank is secured in a machine tool mounting member and the head of the device is closely adjacent a piece of work being bored by a tool member mounted on the slide.

ROY V. RUSSELL.